3,692,475
METHOD FOR MAKING CRYSTALLINE
ZEOLITE Y
Carl E. Johnson, Brookhaven, Miss., assignor to Nalco Chemical Company, Chicago, Ill.
No Drawing. Filed Nov. 16, 1970, Ser. No. 90,148
Int. Cl. C01b 33/28
U.S. Cl. 423—329　　　　　　　　　　　　2 Claims

ABSTRACT OF THE DISCLOSURE

Crystalline zeolite Y is produced in good yield in a short period of time from aqueous alkaline silica-containing solutions and sodium aluminate solutions by the expediency of using elevated temperatures, good agitation and by the careful control of the alumina concentration of the aqueous aluminate solution.

INTRODUCTION

Crystalline zeolite Y and its method of manufacture is described in detail in U.S. 3,130,007. The disclosure of this patent is incorporated herein by reference. This patent teaches heating alkaline silica-containing solutions with aqueous alumina solutions under prescribed conditions to produce crystalline zeolite Y. The present invention is directed to using the general techniques set forth in the above described patent with certain variations whereby zeolite Y is produced in good yield in a very short period of time.

THE INVENTION

In accordance with this invention the crystalline zeolite Y may be prepared in good yield by following the following steps:

(A) Heating an aqueous alkaline silica-containing solution to a temperature ranging between 180°–230° F.;
(B) Adding thereto, without substantial cooling thereof and with agitation, a dilute aqueous sodium aluminate solution which has an $Al_2O_3$ content not greater than 6% by weight to provide a $SiO_2:Al_2O_3$ ratio of from 18:1–30:1 thereby forming a reaction mix; and
(C) Heating said reaction mix with continuous agitation to a temperature ranging between at least as great as the boiling point of the reaction mix to about 230° F. for from 1–6 hours whereby crystalline zeolite Y in good yield is produced.

The most critical part of the process described above presides in the alumina concentration of the sodium aluminate solution. In a preferred embodiment of the invention, the alumina content of these solutions contains from .5 to 6% by weight $Al_2O_3$. The silica source is preferably sodium silicate. Best results are obtained when the $SiO_2:Al_2O_3$ ratio is within the range of 18:1–30:1.

The reaction temperature which is used has as its lower limit the boiling point of the reaction mix up to about 230° F. Since the sodium aluminate solutions used in the practice of the invention are dilute, it is sometimes necessary to heat these solutions so that they do not tend to cool the aqueous alkaline silica-containing solutions to which they are added. The amount of alkali used in the reaction is described in U.S. 3,130,007.

EXAMPLES

Example I

The following presents the preparation of a typical commercial sodium aluminate solution:

|  | Gm. |
|---|---|
| NaOH (pellets 98%) | 228 |
| Water | 393 |
| Alumina trihydrate | 336 |

The caustic and water were heated to boiling about 120° C. The alumina trihydrate was added with stirring. The temperature was held at boiling for about 2 hours. The batch was diluted with water to a total yield of 905 gms.

Example II

The following illustrates the preparation of crystalline zeolite Y using a relatively concentrated sodium aluminate solution:

1259 gm. of F grade sodium silicate
124 gm. of NaOH
2180 gm. of water
78 gm. of SK–30
124 gm. of sodium aluminate (5.7% $Al_2O_3$) solution
400 gm. of water The silicate, sodium hydroxide and water were again heated and mixed to about 90° C. The SK–30 was added and the diluted sodium aluminate added slowly over a period of about 2 minutes. The stirring was continued for about 5 minutes and then shut off. After about 4 hours at 100° C. (incipient boiling) or 102° C. (boiling) samples were taken, washed with deionized water. Y sieve content was good. In the above example, the SK–30 was a commercial crystalline zeolite Y which was used for seeding purposes.

Example III

Example III used the identical procedure set forth in Example II except stirring was continued throughout the reaction. The following represented the total reaction mix.

|  | Gm. |
|---|---|
| Sodium silicate F grade | 1259 |
| NaOH (pellets) | 124 |
| Water | 1780 |
| SK–30 | 78 |
| Water | 800 |
| Sodium aluminate (3.4% $Al_2O_3$) solution | 124 |

Using the more dilute sodium aluminate solution, the yield of crystalline zeolite Y was increased about 8%.

I claim:
1. A method for producing crystalline zeolite Y which comprises the steps of:
(A) heating an aqueous sodium silicate solution to a temperature ranging between 180°–230° F.;
(B) adding thereto without substantial cooling thereof and with agitation a dilute aqueous sodium aluminate solution which has an $Al_2O_3$ content not greater than 6% by weight to form a reaction mix having a $SiO_2:Al_2O_3$ ratio of from 18:1–30:1 and sufficient alkali to form crystalline zeolite Y; and then
(C) heating said reaction mix in the presence of added zeolite Y seed crystals with continous agitation to a temperature ranging between at least as great as the boiling point of the reaction mixture to about 230° F. for from 1–6 hours whereby crystalline zeolite Y in a yield greater than 90% is produced.
2. The method of claim 1 where the dilute aqueous sodium aluminate solution has an $Al_2O_3$ content within the range of 0.5 to 6% by weight.

References Cited

UNITED STATES PATENTS

| 3,321,272 | 5/1967 | Kerr | 23—113 |
| 3,130,007 | 4/1964 | Breck | 23—113 |
| 3,343,913 | 9/1967 | Robson | 23—113 |
| 3,341,284 | 9/1967 | Young | 23—112 |

EDWARD J. MEROS, Primary Examiner

UNITED STATES PATENT OFFICE
CERTIFICATE OF CORRECTION

Patent No. 3,692,475    Dated 9-19-72

Inventor(s) Carl E. Johnson

It is certified that error appears in the above-identified patent and that said Letters Patent are hereby corrected as shown below:

Column 2, Example II, read as follows:

--1259 gm. of F grade sodium silicate
124 gm. of NaOH
2754.04 gm. of water
20.96 gm. of SK-30
7.068 gm. of sodium aluminate--

Column 2, Example III, read as follows:

```
                                            Gm.
--Sodium silicate F grade -------------------1259
  NaOH (pellets) ----------------------------- 124
  Water ------------------------------------1956.84
  SK-30 -------------------------------------- 20.96
  Sodium aluminate --------------------------- 4.216--
```

These above changes express the weights of SK-30 and sodium aluminate as solids and not as weights of solutions as is the case in the issued patent.

Signed and sealed this 1st day of May 1973.

(SEAL)
Attest:

EDWARD M. FLETCHER, JR.        ROBERT GOTTSCHALK
Attesting Officer              Commissioner of Patents